United States Patent

Landi et al.

[11] Patent Number: 5,840,397
[45] Date of Patent: Nov. 24, 1998

[54] SPORTS PAD

[75] Inventors: Curtis L. Landi; Susan L. Wilson, both of Sunnyvale, Calif.

[73] Assignee: Supracor Systems, Inc., San Jose, Calif.

[21] Appl. No.: 747,061

[22] Filed: Nov. 8, 1996

[51] Int. Cl.⁶ ..................................... B32B 3/12
[52] U.S. Cl. ............................. 428/73; 428/116; 428/138
[58] Field of Search ................... 428/116, 118, 428/73, 138; 52/793.1; 156/197

[56] References Cited

U.S. PATENT DOCUMENTS

| | | | |
|---|---|---|---|
| 3,447,163 | 6/1969 | Bothwell et al. | 428/116 X |
| 3,895,152 | 7/1975 | Carlson et al. | 428/116 |
| 4,422,183 | 12/1983 | Landi et al. | 428/116 X |
| 4,465,725 | 8/1984 | Riel | 428/116 |
| 4,485,568 | 12/1984 | Landi et al. | 428/116 X |
| 5,203,607 | 4/1993 | Landi | 428/116 X |
| 5,416,924 | 5/1995 | Sims | 428/100 X |
| 5,496,610 | 3/1996 | Landi et al. | 428/116 X |

*Primary Examiner*—Henry F. Epstein
*Attorney, Agent, or Firm*—Limbach & Limbach L.L.P.

[57] ABSTRACT

An improved sports pad for protecting a particular area of a user's body and including a relatively rigid, lightweight plate molded to conform to the protected body area, an outer layer of resilient thermoplastic honeycomb padding affixed to the outer surface of the plate, and an inner layer of resilient thermoplastic honeycomb padding affixed to the inner surface of the plate. The outer layer is preferably of a closed-cell configuration while the inner layer is of an open-celled configuration perforated to allow the flow of air from cell to cell.

12 Claims, 2 Drawing Sheets

SPORTS PAD

BACKGROUND OF THE INVENTION

1. Field of the Invention

The present invention relates generally to articles used to cushion and protect various body protrusions and muscle areas, and more particularly to a sports pad including a relatively rigid, preformed thermoplastic plate having a layer of flexible thermoplastic elastomeric honeycomb core with open cell structure affixed to its lower surface and a flexible thermoplastic elastomeric honeycomb pad with closed cell structure affixed to its upper surface.

2. Brief Description of the Prior Art

Protective body pads such as knee, thigh, arm and shin pads are widely used for protecting and cushioning a participant's body during sports-related and other physical activities. Frequently, body pads incorporate rigid panels with flexible cushioning materials such as foams or gels. The rigid panel blunts the shock of an impact force and spreads the force over a relatively wide area. The cushioning material buffers the user's body from the rigid panel by absorbing impact forces imparted by the rigid panel to the body. In addition, the cushioning material may shield the user from any rough or sharp edges of the rigid panel.

Foam materials are frequently used as a cushioning material in body pads of the type mentioned above. However, foams are bulky for the amount of protection provided and are typically quite firm and thus unyielding at one extreme, or soft and thus yielding easily in the direction of impact at the other extreme. Impact-absorbing foam pads are usually relatively thick, relatively inflexible, and difficult to ventilate. An example of a protective pad using a high-density closed-cell foam is disclosed in U.S. Pat. No. 5,416,924 issued to Sims and entitled "Flexible Protective Padding".

Honeycomb structures are also used in body pads because they are flexible in the directions perpendicular to the impact yet firm in the direction of impact. Moreover, they are very light in weight and give freedom of movement to the user. For example, Applicants' prior U.S. Pat. No. 4,422,183 discloses a protective shield including a core of lightweight flexible cellular honeycomb material with the axis of the honeycomb cells directed normal to the surface of a user's body. The disclosed device also includes a resilient foam elastomeric layer covering both open ends of the cells. However, the core is not constructed of a resilient material and is prone to buckling upon impact.

Honeycomb core structures constructed from resilient materials have also been used in body pads and shields. For example, Applicants' U.S. Pat. No. 4,485,568 discloses a flexible honeycomb material used in the sole of a shoe. However, the honeycomb material is not shaped to conform to the outer contour of the user's foot. Instead, the honeycomb material is shaped as a flat pad which is disposed in a cavity formed in the midsole of a shoe.

Applicants' U.S. Pat. No. 5,203,607 discloses an improved bicycle seat including a rigid shell supporting a foam layer having a panel of thermoplastic elastomeric honeycomb bonded thereto or imbedded therewithin. In this device, the rigid shell is initially formed into the shape of the bicycle seat. The honeycomb panel is then attached to the rigid shell, and a covering material is used to sheathe the shell and honeycomb panel.

U.S. Pat. No. 5,496,610 issued to Landi discloses a multiple panel that includes a rigid thermoplastic plate bonded to at least one thermoplastic elastomeric honeycomb panel such that, when heated to a forming temperature, the plate and honeycomb panel can be simultaneously formed and then cooled so that they retain a desired shape.

Structures of the types described above can be used for various padding applications and are well suited for particular uses. However, when it comes to pads that must be worn next to a human body during highly energetic play or other physical activity, perhaps the largest concern is the comfort of the user. For example, pads provided for this application must allow heat and perspiration to be vented from beneath the pad, or they quickly become uncomfortable and may cause chafing or blistering of the underlying skin.

Thus, there is a need for a sports pad that is lightweight and conformed to particular body contours, that provides cushioning for the protected body part, that is ventilated to prevent heat build-up and associated discomfort due to perspiration, and that includes a rigid component that protects the body from potentially harmful blunt-trauma-causing impacts.

SUMMARY OF THE INVENTION

It is therefore an object of the present invention to provide an improved sports pad that is lightweight, includes a rigid or semi-rigid plate for spreading impact forces, has an outer padding for preventing injury to an opponent, and has an inner padding for conforming to a contour of the user's body, yet allows movement of air therethrough to prevent build-up of heat and perspiration.

Another object of the present invention is to provide a sports pad of the type described for increasing the wearer's comfort by having means for actively circulating air within the pad and particularly in areas where the pad is in contact with the user's body.

Still another object of the present invention is to provide a pad that includes the above features yet is stiff enough to protect the wearer by absorbing and spreading blunt impact over a relatively large body area.

Yet another object of the present invention is to provide a method of making a sports pad having the features described above.

Briefly, a preferred embodiment of the present invention includes an improved sports pad for protecting a particular area of a user's body and including a relatively rigid, lightweight plate molded to conform to the protected body area, an outer layer of resilient thermoplastic honeycomb padding affixed to the outer surface of the plate, and an inner layer of resilient thermoplastic honeycomb padding affixed to the inner surface of the plate. The outer layer is preferably of a closed cell configuration while the inner layer is of an open-celled configuration perforated to allow the flow of air from cell to cell.

An important advantage of the present invention is that it provides a lightweight pad capable of absorbing substantial blunt forces.

Another advantage of the present invention is that it includes air-circulating passages for cooling the engaged body surface.

Yet another advantage of the present invention is that it is made of a material which can be easily cleaned and kept bacteria-free.

These and other objects and advantages of the present invention will no doubt become apparent to those skilled in the art after having read the following detailed description of the preferred embodiments illustrated in the several figures of the drawing.

DETAILED DESCRIPTION OF THE PREFERRED EMBODIMENTS

Figure 1:
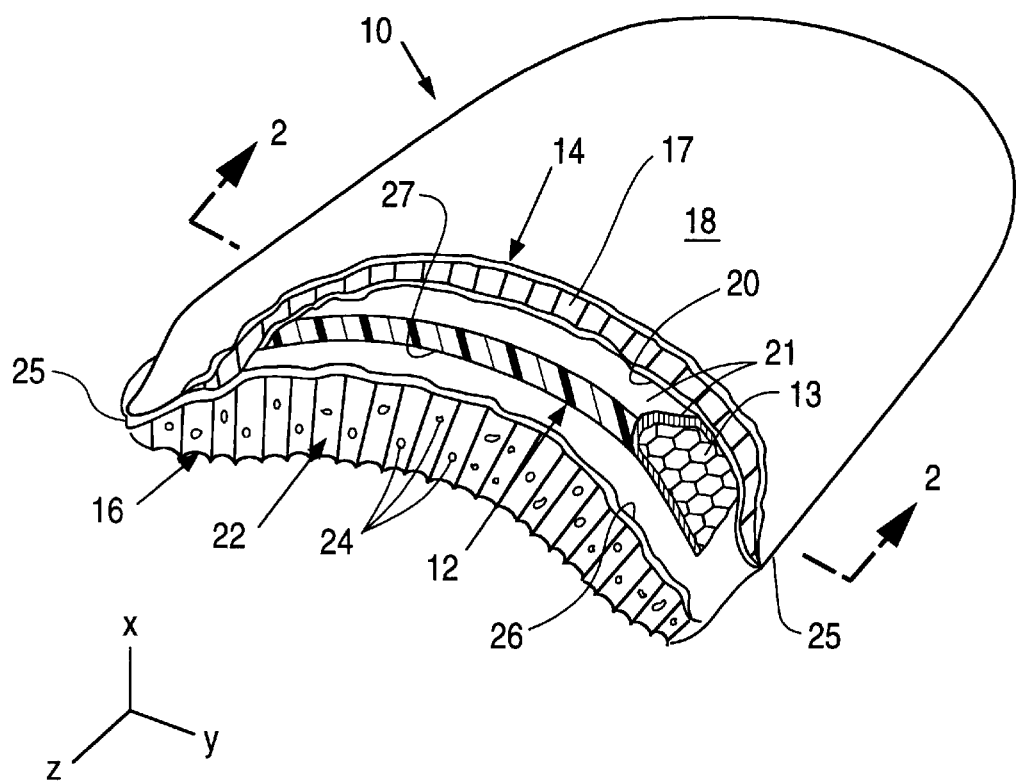
FIG. 1 is a perspective view depicting a preferred embodiment of a particular type of sports pad in accordance with the present invention.

Referring now to FIG. 1 of the drawing, a partially broken perspective view of a sports pad in accordance with the present invention is disclosed and generally designated 10. The illustrated pad 10 is of a type suitable for use as a thigh pad for use in contact sports such as football, and is comprised of a rigid or semi-rigid layer or plate 12 curved along at least one dimension to conform to the thigh of the user to be protected, an outer panel 14 of honeycomb padding, and an inner panel 16 of open-cell honeycomb padding. The plate 12 is preferably made of a generally rectangular piece of thermoplastic material having a thickness and rigidity suitable for the particular application. Alternatively, it could be made of a rigid plastic honeycomb structure, a lightweight metal, fiberglass or other suitable material that can, once formed, hold its shape under impact by forces of anticipated types and magnitudes. Plate 12 may be of a solid configuration, or be perforated, or even be fabricated of a rigid corrugated or open-cell honeycomb panel such as that illustrated in part at 13.

The outer panel 14 is typically a closed-cell structure comprised of a honeycomb core 17 made of resilient thermoplastic material with top and bottom resilient thermoplastic facing sheets 18 and 20, respectively bonded to opposite sides of the core. The panel 14 is preferably of a type and manufacture such as that described in our prior U.S. Pat. No. 5,039,567 entitled "Resilient Honeycomb Panel Having Anisotrophic Flexing Characteristics and Method of Making Same", and disclosure thereof is expressly incorporated herein by reference. The thickness of such panel is typically within the range from ⅛" to ⅜" depending on the particular application. The panel 14 may be thermoplastically bonded, glued, or otherwise affixed to the upper side surface 21 of plate 12.

The inner panel 16 includes a honeycomb core 22 that is made from a selected grade of resilient thermoplastic elastomeric material which has been perforated such that a matrix of small holes 24 exists throughout. Core 22 is preferably open at the bottom and closed at the top (as illustrated) by a sheet 26 of resilient thermoplastic plastic material that is bonded thereto. Panel 16 is typically affixed to the underside of plate 12 by thermoplastic bonding, gluing or otherwise affixing the sheet 26 to the lower face 27 of the plate.

Core 22 may be of the type described in our U.S. Pat. No. 5,180,619 entitled "Perforated Honeycomb", the disclosure of which is incorporated herein by reference. The plastic used in manufacturing honeycomb core 22 is preferably treated with anti-fungal and anti-bacterial chemicals to prevent growth of undesirable fungus or bacteria between cleanings. The perforations 24 and open-cell bottoms allow circulation of air and moisture, and prevent wearer discomfort that may result from perspiration and movement thereof relative to the area of the body where the pad is to be worn. The core 22 is tear-resistant and highly flexible, yet extremely lightweight. Core 22 is a three-dimensional structure which has varying degrees of flex in its width (X), length (Y), and its thickness (Z) dimensions. The core's superior shock absorption and springback characteristics result from the use of thermoplastic or thermoplastic elastomeric materials.

After both panels 14 and 16 are bonded to plate 12, the pad is finished by bonding the perimeters thereof together, as indicated at 25, to envelop and protect the edges of plate 12. The bonding between the overlapping edges of panels 14 and 16 is performed in the same manner as the bonding between the other component parts of the pad using methods known in the art. The preferred method is to use thermal compression bonding accomplished by simultaneously applying heat and pressure to the joinder of the facing sheets 18 and 26.

Figure 2:
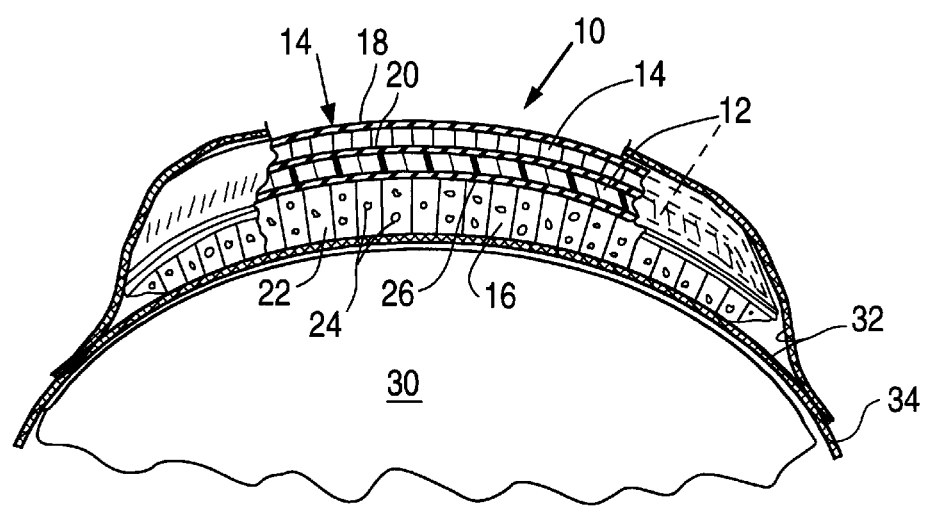
FIG. 2 is a cross-sectional view taken along the line 2—2 of the pad illustrated in FIG. 1.

FIG. 2 is a transverse cross-sectional view of the pad 10 taken along the line 2—2 of FIG. 1 and showing the pad disposed in a pocket 32 of pants 34 and placed against a curved area of the user's body 30, such as the thigh, arm, calf, knee, elbow, etc. The body side of pad 10 is provided by the open-cell honeycomb structure 22 in order to allow the portion of the body 30 that lies beneath the pad to "breathe" and thus remain cool. Due to the circulation of air through honeycomb core 22, body perspiration and heat generated beneath the pad is significantly ventilated, allowing for a more comfortable pad usage than experienced with other prior art protective pads. Partly for this reason, the thickness of the core 22 is preferably designed to be greater than the thickness of the core 17 of the outer panel 16 in order to allow better dispersion of body heat.

Honeycomb panel 14 is not normally in contact with the user's body and in fact may never come in contact with the body of the person wearing the pad. It is therefore usually of lesser thickness than panel 16. On the other hand, panel 14 must be capable of absorbing much of the impact brought upon pad 10 by blunt and/or sudden external forces. The flexible nature of the resilient facing materials of the panel 14 coupled with the flexibility of the honeycomb panel 16 tends to prevent injury to others who may externally strike the pad; i.e., panel 10 provides cushioning not only for the wearer of the pad but also for the person striking or hitting the pad, thereby avoiding injury to the striker as well as the wearer of the pad. The striking energy is absorbed in part by panel 14 and is spread through the substantially rigid plate 12, and then further absorbed by panel 16, thereby tending to prevent injury to the pad user.

Figure 3:
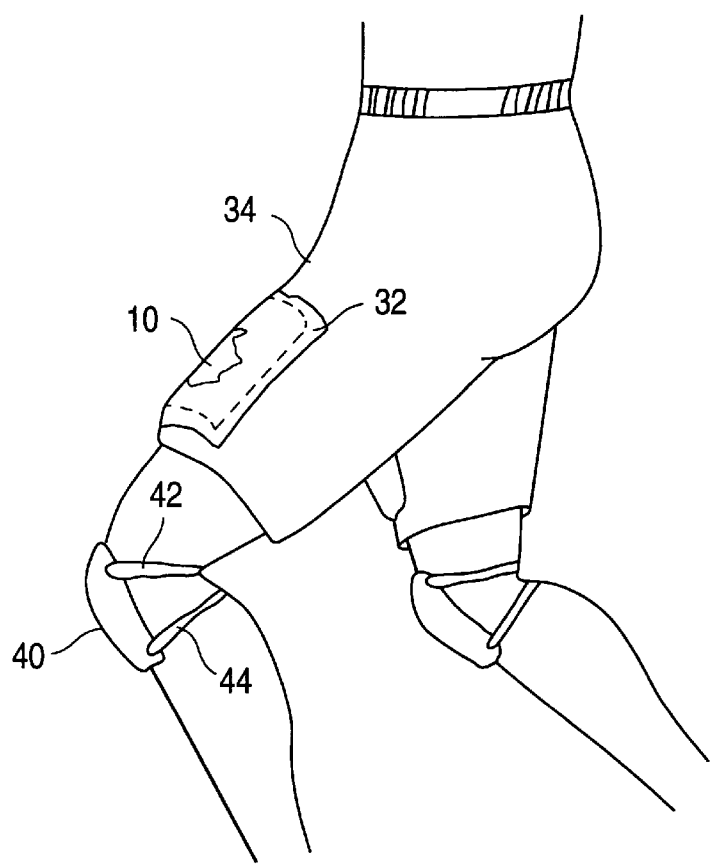
FIG. 3 illustrates examples of applications of the present invention as a thigh pad and a knee pad.

FIG. 3 illustrates embodiments of the present invention in the specific forms of thigh pads 10 and knee pads 40. Thigh pad 10 is typically secured by wearing it inside of a pocket 32 of pants 34 or the like. The knee pads 40 are provided with straps 42 and 44 for securing them to the wearer's leg.

Figure 4:
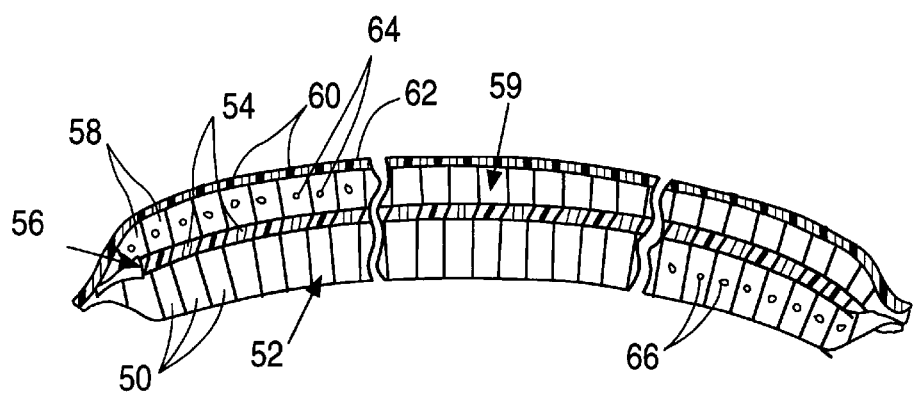
FIG. 4 is a diagram showing multiple variations of an alternative embodiment of the invention.

In FIG. 4 three variations of an alternative embodiment are shown. This embodiment differs from the above-described embodiment in that air-flow passages are provided from at least some of the open cells 50 of the inner core 52 through openings 54 in the rigid plate 56 and thence through at least some of the cells 58 of the outer core 59 and openings 60 in an outside facing sheet 62. In the variation at the left, apertures 64 are also provided in the cell walls of the core 59. In the variation at the right, apertures 66 are provided in the cell walls of the inner core 52. The center segment has no apertures in the cell walls, or alternatively perhaps in all cell walls (not shown). In this embodiment unfaced sides of cores 52 and 59 are thermal-compression bonded or otherwise bonded to the faces of plate 56.

The energy absorption characteristics of this embodiment are somewhat different from that of the first embodiment in that load-bearing cells will collapse as they absorb the input energy and then resiliently return to their uncollapsed configuration when the load is relieved. This particular form of pad would perhaps be more suitable for protecting skeletal body parts where the former embodiment may be more suited to protecting muscular areas of the body.

The device of this invention may be provided in various other forms of sports pads such as hip pads, chest pads, shoulder pads, elbow pads, shin pads, forearm pads, sliding pads, umpire's breast pads, helmet liners, glove pads, etc. The honeycomb cores are preferably made by bonding together ribbons of resilient flexible material as described in the above-referenced patents, but can alternatively be manufactured by injection molding or any other suitable process.

Although the present invention has been described above in terms of certain preferred embodiments, it is anticipated that various alterations and modifications thereof will no doubt become apparent to those skilled in the art. It is therefore intended that the following claims be interpreted as covering all such alterations and modifications as fall within the true spirit and scope of the invention.

What is claimed is:

1. A sports pad for protecting particular areas of a user's body from blunt trauma or similar injury, comprising:

a substantially rigid plate having a lower face and an upper side surface, said plate being formed to fit the curvature of a body surface to be protected;

an outer panel including a first flexible cellular honeycomb core affixed to said upper side surface; and an inner panel including a second flexible cellular honeycomb core secured to said lower face and adapted to engage a user's body, the cell walls of said second core being apertured to allow fluid flow through said cells.

2. A sports pad as recited in claim 1 wherein said plate is formed of a solid layer of plastic material.

3. A sports pad as recited in claim 1 wherein said plate is formed by a rigid honeycomb structure.

4. A sports pad as recited in claim 1 wherein said first honeycomb core has cells extending from a first core face to a second core face, an outer facing sheet affixed to said first core face, and an inner facing sheet affixed to said second core face, said inner and outer facing sheets being operative to close the cells of said first core, said inner facing sheet being bonded to said upper side surface.

5. A sports pad as recited in claim 4 wherein said second honeycomb core has open cells extending between a third core face and a fourth core face, said third core face having a facing sheet bonded thereto and to said lower face, the cells of said second honeycomb core being open at said fourth core face such that there is no facing sheet bonded thereto.

6. A sports pad as recited in claim 1 and further comprising means for affixing the pad to a user's body.

7. A sports pad as recited in claim 6 wherein said first honeycomb core has cells extending from a first core face to a second core face, an outer facing sheet affixed to said first core face, and an inner facing sheet affixed to said second core face, said inner and outer facing sheets being operative to close the cells of said first core, said inner facing sheet being bonded to said upper side surface.

8. A sports pad for protecting a particular body part of a user, comprising:

a rigid plate deformed to correspond to the contour of a particular body part to be protected;

a first resilient energy-absorbing panel affixed to one side surface of said plate, said first panel including a honeycomb core; and a second resilient energy-absorbing panel having a first side affixed to a side surface of said plate opposite said one side surface, and a second side adapted to engage said particular body part, said second panel including a honeycomb core having cells extending between said first and second sides, said cells being closed at said first side and open at said second side.

9. A sports pad as recited in claim 8 wherein the core walls forming said cells are perforated so as to permit fluid flow between adjacent cells.

10. A sports pad as recited in claim 8 wherein said first panel includes a honeycomb core having cells closed on one side by a first facing sheet and closed on an opposite side by a second facing sheet.

11. A sports pad as recited in claim 8 wherein said plate has apertures therein to permit fluid flow therethrough.

12. A sports pad as recited in claim 11 wherein said first panel has apertures formed therein to permit fluid flow therethrough.

* * * * *